US012579574B2

(12) United States Patent
Britz et al.

(10) Patent No.: US 12,579,574 B2
(45) Date of Patent: Mar. 17, 2026

(54) METHODS AND SYSTEMS FOR MINIMIZING DATA STORAGE WHEN FACILITATING BLOCKCHAIN OPERATIONS ACROSS DISTRIBUTED COMPUTER NETWORKS IN DECENTRALIZED APPLICATIONS

(71) Applicant: Coinbase, Inc., Oakland, CA (US)

(72) Inventors: Kevin Britz, Oakland, CA (US); Arjun Rao, Oakland, CA (US)

(73) Assignee: Coinbase, Inc., Oakland, CA (US)

( * ) Notice: Subject to any disclaimer, the term of this patent is extended or adjusted under 35 U.S.C. 154(b) by 358 days.

(21) Appl. No.: 17/729,662

(22) Filed: Apr. 26, 2022

(65) Prior Publication Data

US 2022/0351288 A1 Nov. 3, 2022

Related U.S. Application Data

(60) Provisional application No. 63/179,918, filed on Apr. 26, 2021, provisional application No. 63/179,888, filed on Apr. 26, 2021.

(51) Int. Cl.
*G06Q 40/04* (2012.01)
*G06Q 20/36* (2012.01)

(52) U.S. Cl.
CPC ......... *G06Q 40/04* (2013.01); *G06Q 20/3672* (2013.01); *G06Q 2220/00* (2013.01)

(58) Field of Classification Search
CPC .... H04L 9/50; H04L 2209/56; G06Q 2220/00
See application file for complete search history.

(56) References Cited

U.S. PATENT DOCUMENTS

| | | | | |
|---|---|---|---|---|
| 11,367,066 B2 * | 6/2022 | Kim | ...................... | H04L 9/3247 |
| 2018/0060836 A1 * | 3/2018 | Castagna | ............... | G06Q 20/10 |
| 2019/0236561 A1 * | 8/2019 | Hamilton | ............. | G06Q 20/202 |
| 2020/0327609 A1 * | 10/2020 | Dubrofsky | ............. | G06Q 40/06 |
| 2020/0334674 A1 * | 10/2020 | Youngblood | .......... | G06Q 20/36 |
| 2020/0364703 A1 * | 11/2020 | Joveski | ..................... | H04L 9/50 |
| 2022/0271915 A1 * | 8/2022 | Turner | ................. | H04L 9/3247 |

OTHER PUBLICATIONS

"Mann et al., Optimal incentives for collective intelligence, Oct. 17, 2017, arXiv: 1611.03899v2 [cs.GT]" (Year: 2017).*
Fatoohi et al., Middleware for Building Distributed Applications Infrastructure, NAS Technical Report NAS-97-026, Dec. 1997 (Year: 1997).*

* cited by examiner

*Primary Examiner* — Patrick Mcatee
*Assistant Examiner* — Sima Asgari
(74) *Attorney, Agent, or Firm* — Foley & Lardner LLP

(57) ABSTRACT

A system that deploys a first smart contract that include a set of predefined functions that enable exchange of a first cryptocurrency on a first blockchain network. Additionally, the system deploys a second smart contract with the set of predefined functions that enable exchange of a second cryptocurrency on a second blockchain network. Furthermore, the two sets of smart contracts allow for the blockchain operations to be conducted by referencing an exchange platform supported by the system. By referencing the exchange platform, the corresponding sets of functions may be activated to perform exchanges across the blockchain networks.

20 Claims, 9 Drawing Sheets

100

107

109

105

WAN

101

LAN (Opt.)

111

| PROCESSOR | NETWORK INTERFACE | 117 |

| RAM | ROM
115 | INPUT/OUTPUT | 119 |

113

MEMORY

OPERATING SYSTEM — 123

CONTROL LOGIC — 125

103    OTHER APPLICATIONS — 127

121

129    DB1    DB2    131

```
/**
 * @notice Reward tokens that may be accrued as rewards
 * @return Exhaustive list of all reward token addresses
 */
function rewardTokens() external view returns (address[]);
```

FIG. 3

```
/**
 * @notice Balance of accrued reward token for account
 * @param rewardToken Reward token address
 * @param account User's wallet address
 * @return Balance of accrued reward token for account
 */
function balanceOfReward(
address rewardToken,
address account
) external view returns (uint256);
```

FIG. 4

```
/**
 * @notice Annual Percentage Yield for the specific reward token. Measured in
 relation to the base units of the underlying asset vs base units of the
 accrued reward token.
 * @param rewardToken Reward token address
 * @return APY times 10^18
 */
function rate(address rewardToken) external view returns (uint256);
```

FIG. 5

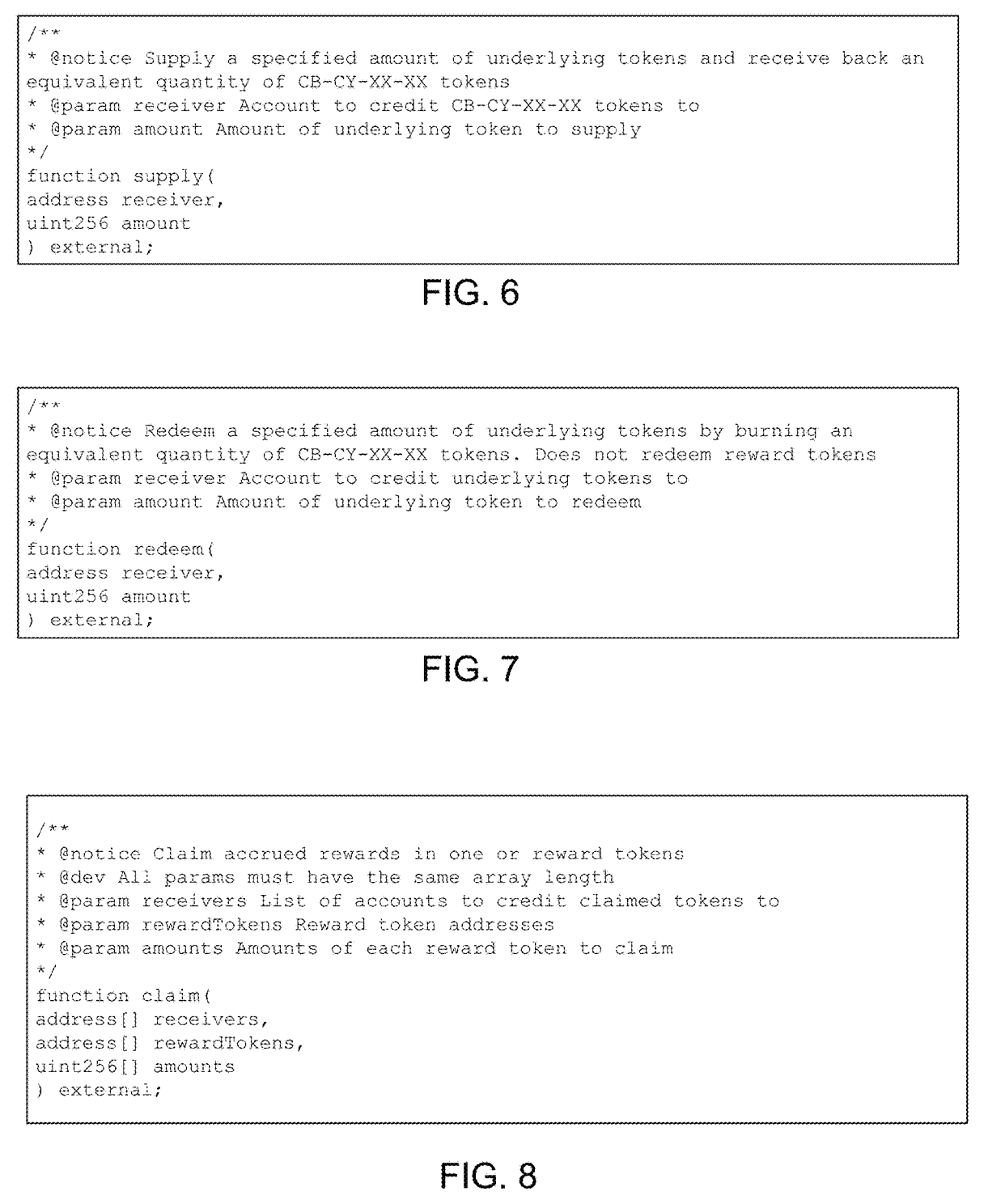

```
/**
 * @notice Supply a specified amount of underlying tokens and receive back an
equivalent quantity of CB-CY-XX-XX tokens
 * @param receiver Account to credit CB-CY-XX-XX tokens to
 * @param amount Amount of underlying token to supply
 */
function supply(
address receiver,
uint256 amount
) external;
```

FIG. 6

```
/**
 * @notice Redeem a specified amount of underlying tokens by burning an
equivalent quantity of CB-CY-XX-XX tokens. Does not redeem reward tokens
 * @param receiver Account to credit underlying tokens to
 * @param amount Amount of underlying token to redeem
 */
function redeem(
address receiver,
uint256 amount
) external;
```

FIG. 7

```
/**
 * @notice Claim accrued rewards in one or reward tokens
 * @dev All params must have the same array length
 * @param receivers List of accounts to credit claimed tokens to
 * @param rewardTokens Reward token addresses
 * @param amounts Amounts of each reward token to claim
 */
function claim(
address[] receivers,
address[] rewardTokens,
uint256[] amounts
) external;
```

FIG. 8

```
/**
* @notice Atomic redeem and claim in a single transaction
* @dev tos.length[0] corresponds to the address that the underlying token is
redeemed to. tos.length[1:n-1] hold the to addresses for the reward tokens
respectively.
* @param receivers List of accounts to credit tokens to
* @param amounts List of amounts to credit
* @param claimTokens Reward token addresses
*/
function redeemAndClaim(
address[] receivers,
uint256 amounts,
address[] claimTokens
) external;
```

FIG. 9

```
/**
 * @return Contract delegate address
 */
function delegate() external view
returns (address);
```

FIG. 10a

```
/**
 * @notice Snapshots delegate balance
and update delegate address
 * @dev Only callable by admin
 * @param newDelegate New delegate
address
 */
function updateDelegate(address
newDelegate) external;
```

FIG. 10b

```
/**
 * @return Contract admin address
 */
function admin() external view
returns (address);
```

FIG. 11a

```
/**
 * @notice Updates the admin address
 * @dev Only callable by admin
 * @param newAdmin New admin address
 */
function transferAdmin(address
newAdmin) external;
```

FIG. 11b event Supply(address indexed sender, address indexed receiver, uint256 amount);

FIG. 12a event Redeem(address indexed sender, address indexed receiver, uint256 amount);

FIG. 12b event Claim(address indexed sender, address indexed receiver, address indexed rewardToken, uint256 amount);

FIG. 12c event DelegateUpdated(address indexed previousDelegate, address indexed newDelegate);

FIG. 12d event AdminTransferred(address indexed previousAdmin, address indexed newAdmin);

FIG. 12e

METHODS AND SYSTEMS FOR MINIMIZING DATA STORAGE WHEN FACILITATING BLOCKCHAIN OPERATIONS ACROSS DISTRIBUTED COMPUTER NETWORKS IN DECENTRALIZED APPLICATIONS

CROSS REFERENCE TO RELATED APPLICATIONS

This application claims priority to provisional U.S. Application Ser. No. 63/179,888, filed Apr. 26, 2021, and provisional U.S. Application Ser. No. 63/179,918, filed Apr. 26, 2021, each entitled "Cryptocurrency Rewards System and Method", and each of which is herein incorporated by reference in its entirety for all purposes.

BACKGROUND

In recent years, the use of blockchains and blockchain technology has exponentially increased. Blockchains comprise a list of records, called "blocks," that are "chained" together using cryptography. Each block may comprise data that is computed using a one-way function (e.g., a function that is practically impossible to invert or reverse-compute) of a previous block, a timestamp (e.g., indicating a creation and/or modification time), and additional data (e.g., transactional or operational data related to blockchain operations).

While publicity for blockchains and blockchain technology has been concentrated on its use for cryptocurrencies and smart contracts, blockchains and blockchain technology may be applicable to numerous technological avenues. A common theme of these technological avenues is the decentralization of blockchains and blockchain technology such that facilitation, management, and/or verification of blockchain-based operations is governed or administered not by one authority but by a community of users. The blockchain may therefore remain distributed (e.g., on a network of computers that communicate and coordinate their actions by passing messages to one another), and in many cases public, through a digital ledger, which records the series of blocks forming the chain. Notably, because each block depends on a preceding block, edits to existing blocks in the chain may not be made without affecting subsequent blocks.

Furthermore, updates to the blockchain (e.g., the addition of new blocks) may include incentivization systems that reward community members for the generation of the updates while also ensuring a consensus by the community. In this manner, the proliferation of the blockchain may proceed indefinitely.

BRIEF SUMMARY

Methods and systems are described herein for novel uses and/or improvements to blockchains and blockchain technology. As one example, methods and systems are described herein for improvement to proof-of-stake consensus mechanisms for maintaining blockchain networks and the facilitation thereof. For example, conventional blockchain networks rely on a backbone of proof-of-work consensus mechanisms to provide decentralized applications in a trustless environment. The proof-of-work mechanism is the key to ensuring that no centralized party is required for governing or administering the community. However, a drawback of the proof-of-work mechanism is the high resource and energy use associated with the use of the proof-of-work mechanism. In view of the high resource and energy use associated with the use of the proof-of-work mechanism, methods and systems are described herein relating to proof-of-stake consensus mechanisms.

As opposed to a proof-of-work mechanism, which requires a computing device to perform a substantial amount of work to maintain and facilitate the blockchain network (thus leading to the high resource and energy use), the proof-of-stake consensus mechanisms require a user (e.g., a computing device) to stake their digital tokens on a beacon chain to secure the blockchain network. For example, in Ethereum 2.0, a user is required to stake a minimum of 32 ETH to become a validator. While users that do provide a stake may be rewarded by the blockchain network (e.g., in the form of newly issued tokens), there are several technical challenges to staking.

First, staking and validating blockchains requires both specialized software and hardware. Second, while the resource and energy use of a proof-of-stake mechanism is lower than a proof-of-work mechanism, it is not negligible. Finally, the proof-of-stake mechanism for validators requires the staked tokens to remain stationary while participating as validators. That is, users that stake their tokens with the blockchain network in order to secure the network cannot unstake their tokens until after blockchain operations are enabled. Because there are no technical means to determine when this may occur, and in some cases it may take years to occur, if it ever does, users have no means to account for this uncertainty.

One solution to the aforementioned technical challenges may be the creation of exchange staking. For example, exchange staking refers to the process of staking tokens through a centralized exchange. While this allows users to stake and unstake at any time, it not only requires users to pay a percentage fee on their rewards to the exchange but also reintroduces a centralized authority back into what was previously a decentralized environment. That is, this solution to the technical challenges virtually nullifies many of the benefits that decentralized applications sought to achieve.

For example, the centralized exchange creates a lack of transparency and decentralization and requires users to now have faith in the centralized exchange. Furthermore, the structure of the centralized exchange creates negative impacts on users in both technical and practical means. As one example, centralized exchanges are motivated to require funding during onboarding and distribute stakes across multiple validator operators (e.g., create user pools across a plurality of validators for a blockchain network). This leads to three pitfalls for users. First, this structure leads to lower yield because rewards are socialized across validators treating the validator operators equally, regardless of performance. Second, validator operators are disincentivized from offering liquid staking to their users since doing so would spread most of a user's funds to other validator operators. Finally, pooling of funds creates regulatory challenges for institutions required to keep user funds segregated. As another example, centralized exchanges are motivated to attribute rewards by increasing the number of liquid staking derivative tokens over time. This leads to two additional pitfalls for users. First, the increase in quantity makes it difficult to offer the liquid token on exchanges and layer 2 blockchain networks. Second, this increase in quantity is tax inefficient since it creates a taxable event every day.

The methods and systems described herein overcome this novel technical problem by deploying a plurality of smart contracts featuring a predetermined set of functions. The combination and specialization of these functions facilitate a decentralized application organization (DAO) that facilitates a centralized exchange while maintaining transparency. Specifically, the DAO deploys a first smart contract that include a set of predefined functions that enable exchange of a first cryptocurrency on a first blockchain network. Additionally, the DAO deploys a second smart contract with the set of predefined functions that enable exchange of a second cryptocurrency on a second blockchain network. Furthermore, the two sets of smart contracts allow for the blockchain operations to be conducted by referencing an exchange platform supported by the DAO. By referencing the exchange platform, the corresponding sets of functions may be activated to perform exchanges across the blockchain networks.

While the use of the multiple deployed smart contracts provides for additional transparency, the multiple deployed smart contracts may also create an additional technical burden in that more blockchain operations are conducted and thus more blockchain characteristics (e.g., variables related to blockchain operation characteristics such as staking positions, rewards occurred, token supply, etc.) require processing. That is, through the use of the unconventional exchange platform described above, the system may create additional data storage needs. In order to accommodate the additional blockchain characteristics and/or data storage requirements, the methods and system invoke a novel optimization based on three global variables: total balance, total rewards, and total debt as well as the corresponding user variables. The system may likewise minimize the number of variables by reformatting the corresponding user variables into a single variable. By doing so, the amount of data needed to be stored in the blockchain and/or processing by the exchange platform is minimized. That is, the single variable (e.g., a user performance metric) may replace the three previous user-based variables. The system may then attribute blockchain operation characteristic updates (e.g., rewards) based on the performance metric In some aspects, methods and systems for minimizing data storage when facilitating blockchain operations across distributed computer networks in decentralized applications are described. For example, the system may deploy, by a blockchain exchange platform having a memory and at least one processor, a first smart contract configured to interface with a first blockchain protocol defining a first blockchain token, wherein the first smart contract includes at least the following predefined set of functions: a supply function configured to deposit principal blockchain assets; a redeem function configured to withdraw the principal blockchain assets; and a claim function configured to obtain blockchain operation characteristic updates accrued based on the deposited principal blockchain. The system may deploy, by the blockchain exchange platform, a second smart contract configured to interface with a second blockchain protocol different from the first blockchain protocol, the second blockchain protocol defining a second blockchain token different from the first blockchain token, wherein the second smart contract includes at least the same functions as the predefined set of functions included in the first smart contract. The system may receive, by the blockchain exchange platform, a first request to obtain blockchain operation characteristic updates associated with a deposit of an amount of the first blockchain token. The system may invoke, by the blockchain exchange platform, the claim function of the first smart contract to increment a first account with a first amount of blockchain updates. The system may receive, by the blockchain exchange platform, a second request to obtain blockchain operation characteristic updates associated with a deposit of an amount of the second blockchain token. The system may invoke, by the blockchain exchange platform, the claim function of the second smart contract to increment the first account or a second account with a second amount of blockchain updates.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein:

FIG. 3 illustrates an example function call for identifying addresses storing tokens associated with one or more cryptocurrencies according to one or more illustrative aspects described herein.

FIG. 4 illustrates an example function call for determining a balance of a cryptocurrency token according to one or more illustrative aspects described herein.

FIG. 5 illustrates an example function call for determining a return rate for a cryptocurrency according to one or more illustrative aspects described herein.

FIG. 6 illustrates an example function call for depositing cryptocurrency according to one or more illustrative aspects described herein.

FIG. 7 illustrates an example function call for redeeming deposited cryptocurrency according to one or more illustrative aspects described herein.

FIG. 8 illustrates an example function call for claiming tokens awarded based on a deposited amount of principle according to one or more illustrative aspects described herein.

FIG. 9 illustrates an example function call for redeeming a user's underlying principal and claiming corresponding rewards according to one or more illustrative aspects described herein.

FIGS. 10a and 10b illustrate function calls for managing a delegate account address for a smart contract according to one or more illustrative aspects described herein.

FIGS. 11a and 11b illustrate function calls for managing a smart contract admin address according to one or more illustrative aspects described herein.

FIGS. 12a-12e illustrate example smart contract events according to one or more illustrative aspects described herein.

DETAILED DESCRIPTION

Figure 1:
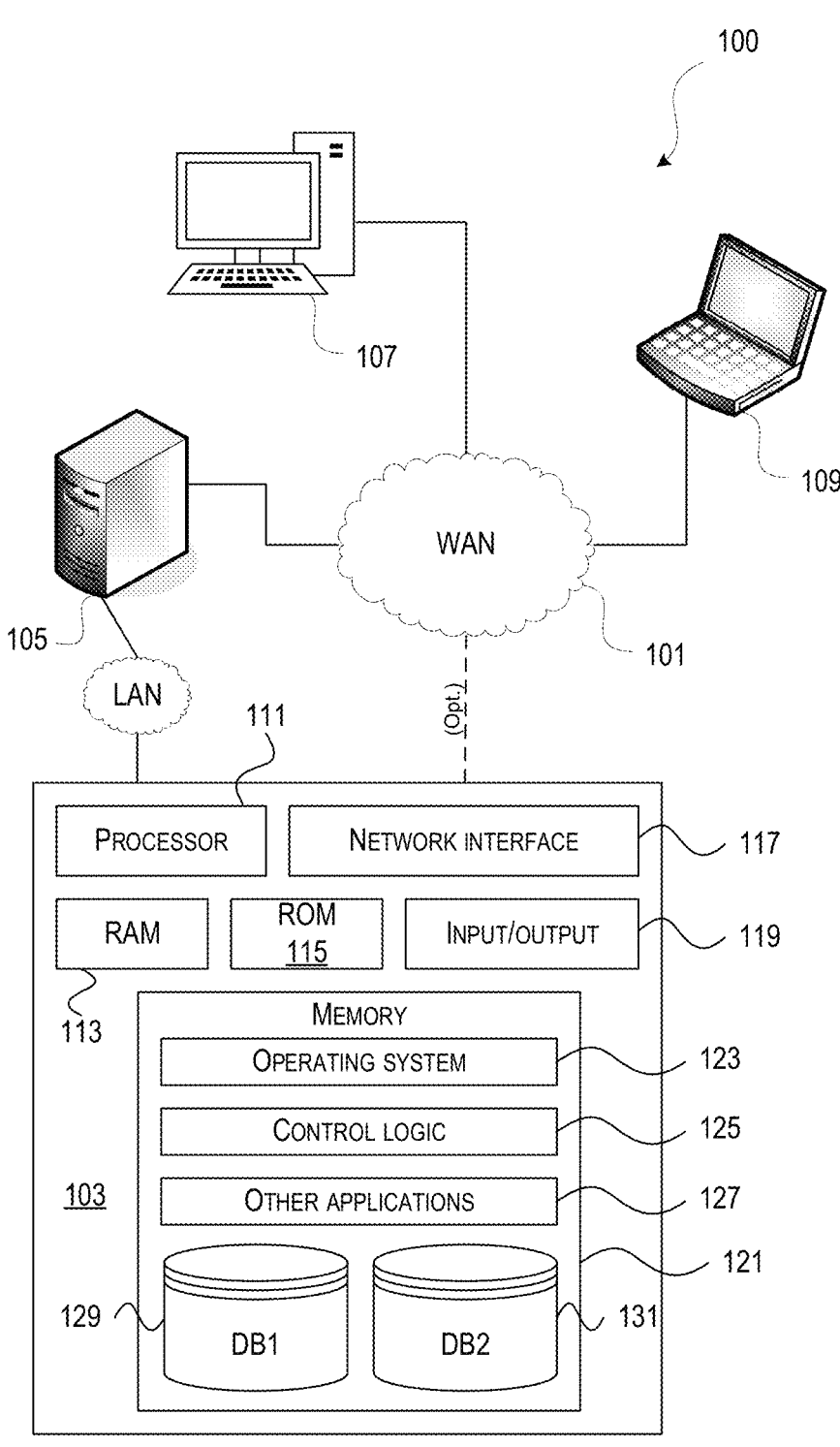
FIG. 1 depicts a network architecture that may be used to implement one or more illustrative aspects described herein.

Aspects described herein generally relate to cryptocurrency management, protocol interfacing, and transaction processing. More specifically, one or more aspects described herein provide improvements in managing multiple different types of cryptocurrency through a common platform using a common smart contract interface.

In the following description of the various embodiments, reference is made to the accompanying drawings, which form a part hereof, and in which is shown by way of illustration various embodiments in which aspects described herein may be practiced. It is to be understood that other embodiments may be utilized and structural and functional modifications may be made without departing from the scope of the described aspects and embodiments. Aspects described herein are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed to techniques, methods, and systems for providing financial services and performing financial transactions using a variety of different cryptocurrencies through a standard smart contract interface. For example, a cryptocurrency management system may cause smart contracts with a standard interface to be deployed for multiple types of cryptocurrencies. The management system may then make the services available to users and, in response to a request for a financial service, invoke a standard function call defined as part of the standard interface. As a result, the management system does not need to maintain separate lists or databases of function calls for each of the myriad cryptocurrencies and protocols that users may want to use to conduct financial transactions. Rather, the same transaction or process may be performed for every cryptocurrency and/or smart contract protocol using the same function call. Given the proliferation of smart contracts and the increasing types of cryptocurrencies, it can be important and advantageous to provide a common platform through which various types of cryptocurrency can be efficiently and effectively secured and managed (e.g., transacted, stored, etc.).

According to some aspects, a management system may be configured to provide a reward financial service whereby users who invest funds receive a reward for that investment. The management system may define a standard interface for rewards-based financial services that includes a specified set of function calls including supply, redeem, claim, balance, among others. This set of function calls may allow for more efficient transaction processing and cryptocurrency management. Additionally, in some arrangements, the management system may store principal and reward funds separately. This may allow for easier accounting and allow for the principal (which is typically invested for a certain amount of time) to be put in cold storage, while rewards may be kept in a hot storage.

According to other aspects, the management system may, upon receiving a request from a user to perform a financial transaction, determine the cryptocurrency to be transacted and/or other parameters of the financial transaction. Based on this information, the management system may identify the appropriate smart contract for that cryptocurrency and for the requested type of transaction (e.g., rewards, loans, etc.). Then, the management system may invoke a predefined function call or calls for executing the requested financial transaction through the identified smart contract.

According to still other aspects, rewards (e.g., reward tokens or funds) of a particular type may be stored in aggregate for all users in a single account belonging to or specified by the management system. Using a single account to accrue rewards may reduce the amount of accounting and therefore, processing, required by the management system. The smart contract only needs to deposit rewards into a single account, and the management system only needs to perform accounting when a user wishes to claim their rewards. As referred to herein, rewards may be expressed as blockchain operation characteristic updates.

As referred to herein, the system may monitor rewards as a performance metric. As referred to herein, a performance metric may comprise a qualitative or quantitative assessment of a performance of a validator, group of validators, and/or operator. The performance metric may be an absolute metric or a relative metric (e.g., based on an average, median, or threshold range of other validators in a tranche or on the blockchain). In some embodiments, the performance metric may be used by the system to determine a size of a reward and/or raise or lower a tranche of a validator. The performance metric may be assigned and/or changed based on a performance of a validator while the validator is conducting one or more validator components. Furthermore, an amount that a performance metric may be changed may be based on a weighted average of the performance of a particular component. For example, the system may determine a first weight corresponding to a first performance component (e.g., validating) and a second weight corresponding to a second performance component (e.g., attesting). For example, the system may determine a composite performance metric based on individual performance metrics corresponding to one or more performance components.

As referred to herein, a performance component may comprise one or more components of the proof-of-stake process. For example, the proof-of-stake process may comprise validating and attesting as well as other operations such as slot generation, crosslinking, or a finality/publishment of blocks to a blockchain to the extent that a validator is involved in these operations. For example, during validation, the system may randomly select a validator to add a new blockchain operation that has been submitted to the blockchain network as a proposed block. The system may determine a number of users that have attested to the proposed block, the ratio of attestation responses (e.g., either for or against), a timeliness of the proposal generation, and/or other factors to determine a performance metric component for the validation performance component.

A validator may be controlled and/or operated by an operator. As referred to herein, an operator is a controller of one or more validators. The validator may comprise a user device that performs one or more functions in order to facilitate blockchain operations on the blockchain network. In some embodiments, a decentralized autonomous organization, exchange platform, and/or one or more components or interfaces thereof (referred to herein collectively and in the alternative as "the system"), may receive, from a user device, a communication requesting operator authorization with decentralized autonomous organization. In response, the system may determine an operating deposit address for the validator and request a token subset (e.g., a number of, or amount of, a given token and/or digital asset).

In response to a validator proposing a new block, non-selected validators may attest to another validator's proposal. This attestation may comprise confirming that the blockchain operation meets one or more rules or blockchain protocols. In some embodiments (e.g., those on the Ethereum network), an attestation is recorded on an overseeing ledger called the "beacon chain" rather than separate "shard" networks.

The system may determine a number of users that have attested to each block, the attestation response (e.g., either for or against), a timeliness of the attestation, and/or other factors to determine a performance metric component for this performance component. For example, the system may determine a higher performance metric component for a validator in which attestation occurs quickly, for which attestation is successful, or for which attestation reaches one or more thresholds (e.g., at least 128 users attesting each shard block, at least 200 users attesting each shard block, etc.).

For example, the system may activate a validator upon receipt of a sufficient stake (e.g., a digital currency or asset). In some embodiments, such as those implementing Ethereum, this amount may comprise at least 32ETH. While authorized as a validator, as with proof-of-stake mechanisms in general, validators do not need significant computational power to mine blocks for the blockchain network. Instead, the validators are randomly selected to create (propose) blocks depending on their percentage stake (e.g., an amount or size of the token subset). When validators are not chosen by the system, the system will trigger the validators to validate proposed blocks from other validators (e.g., "attest" to the proposed blocks). The initial token subset is used as an insurance against a validator's performance. For example, the system may provide rewards (e.g., in the form of newly minted tokens, transfers of digital assets, increases in validator tranche, and/or other performance bonuses) to validators both for proposing new blocks and for attesting to other validators' blocks. In contrast, the system may confiscate a portion of the submitted token subset and/or lower a validator tranche if the validator goes offline, fails to validate/attest, and/or has a low performance metric. Additionally or alternatively, the system may confiscate the entirety of the token subset, assign an additional penalty to the operator, and/or ban the operator/validator if the validator attests to a malicious block or for deliberate collusion.

These and other aspects may be implemented as automated computerized methods, in one or more data processing systems operating substantially autonomously, as computer readable instructions (software) stored on one or more non-transitory computer readable media executable by a data processing system, or in any other statutory subject matter under 35 USC § 101.

As a general introduction before discussing various elements in more detail below, one or more aspects described herein relate to a cryptocurrency system and smart contracts for providing financial services across different types of cryptocurrencies using a standard interface. A cryptocurrency management system through which the financial services are offered to users may be configured to deploy such smart contracts or otherwise cause such smart contracts to be deployed onto a blockchain. The cryptocurrency management system may then invoke an appropriate function (e.g., execute a function call) based on the requests of the user without having to identify and call protocol-specific or contract-specific functions. Instead, the standard interface provides a predefined set of functions that is applicable and supported by each of multiple smart contracts corresponding to disparate cryptocurrencies in order to process the financial services offered through the system. According to one aspect described herein, the financial services offered by the management system include rewards. Rewards, as used herein, refers to any funds that are given to an entity beyond and based on a principal amount deposited by that entity. For example, rewards or interest may be paid upon a user investing or otherwise locking in some amount of principal for a specified amount of time. Accordingly, the management system may allow users to supply a principal amount of cryptocurrency through the management system to a corresponding smart contract and accrue rewards on the user's behalf. The management system may subsequently allow the user to redeem their principal (e.g., when an investment period is over) and/or to claim their rewards. In some arrangements, the principal and rewards may be stored separately (e.g., in different wallets or accounts) for easier accounting and processing.

Blockchains are a particular type of database software that have been under continuous development and constant improvement since Satoshi Nakamoto first published "Bitcoin: A Peer-to-Peer Electronic Cash System" in 2008. At its essence, a blockchain is a type of database that stores data only after that data is agreed upon by computers linked in a peer-to-peer (p2p) network, and where each "block" of data must be agreed upon before another block of data can be added. Blockchain data is said to be immutable insofar as, once a block is added to the blockchain, it cannot be changed or removed. In addition, blockchain algorithms typically operate based on "trustless" protocols whereby none of the peers in the p2p network need to be affiliated with or trust each other in order for the block to be agreed upon and added to the Blockchain. To the contrary, it is actually preferable (and perhaps even required) that no single organization or entity controls greater than 50% of the peers on the network, because in such situations a majority actor could take over decision-making within many of the trustless protocols that blockchains use to add data to the blockchain. That majority actor could then add or alter data that might not otherwise be agreed upon by the entities acting reasonably when none of them has majority control. For this reason, blockchains are typically queryable by public APIs (often navigable via blockchain explorer web sites) so that their data can be readily audited, although some blockchains may remain private.

Blockchains can store any kind of data, although at their inception blockchains were primarily used to store digital tokens or cryptocurrency, such as Bitcoin (as used herein, "token" can refer to a cryptocurrency, virtual currency, digital token or any similar construct stored on a blockchain). Cryptocurrencies such as Bitcoin, however, merely use a blockchain as a means to transparently record their payment ledgers. Blockchains can also be used to immutably record any type of data, such as transaction data, votes in an election, product inventories and status, user identifications, deeds to homes, time and location information, and much more.

In order to store tokens for users, each user can have one or more wallet "addresses" on the blockchain to which tokens can be attributed. Each address is typically the public key of a public/private key pair in a PKI infrastructure used by the blockchain. When one user sends some amount of tokens to another user, the sending user's wallet software generates the relevant payment information (sender, receiver, and amount), signs the data using the sending wallet's private key, and submits the transaction to the blockchain for acceptance. Once accepted, the amount of sent tokens become attributed to the receiving wallet rather than the sending wallet in the blockchain's token ledger.

As blockchains have developed, so have their capabilities. Some newer and more sophisticated blockchains allow users to run programs called smart contracts. A smart contract refers to a program that, once deployed, is stored as data on the blockchain itself and cannot be altered. Each smart contract has an associated address on the blockchain, and the source code of the smart contract defines how payments sent to the smart contract address are automatically processed and handled. Because the smart contract is stored on the blockchain itself, the source code for the smart contract can be audited by others to ensure the smart contract operates as intended or advertised. Smart contracts can be thought of as programs that act as self-executing contracts where the terms of the agreement between the buyer and the seller are directly written into lines of code. A user can send tokens directly to a wallet address associated with the smart contract, and the smart contract will execute based on the functions specified in its source code.

For example, a simple smart contract might act as a sort of flight cancellation insurance, where a user pays the smart contract 1% of the fare and receives a 100% refund if the flight is cancelled. In this example, a user might send an amount of cryptocurrency to a smart contract address as the purchase fee, along with data identifying a specific airline flight (e.g., airline, flight number, and date). The smart contract records the wallet address from which the "insurance" was purchased, and then monitors the flight status of the requested flight. The smart contract might check publicly accessible APIs providing flight information and, if the flight was canceled, automatically send to the wallet from which the insurance was purchased, a refund in the amount of 100% of the fare (e.g., 100×PurchaseFee). This is just a simple example for illustrative purposes. There are an infinite number of examples of smart contracts, each of varying complexity.

A smart contract may be used to perform one or more blockchain operations. As referred to herein, "blockchain operations" may comprise any operations including and/or related to blockchains and blockchain technology. For example, blockchain operations may include conducting transactions, querying a distributed ledger, generating additional blocks for a blockchain, transmitting communications-related non-fungible tokens, performing encryption/ decryption, exchanging public/private keys, and/or other operations related to blockchains and blockchain technology. In some embodiments, a blockchain operation may comprise the creation, modification, detection, and/or execution of a smart contract or program stored on a blockchain. For example, a smart contract may comprise a program stored on a blockchain that is executed (e.g., automatically, without any intermediary's involvement or time loss) when one or more predetermined conditions are met. In some embodiments, a blockchain operation may comprise the creation, modification, exchange, and/or review of a token (e.g., a digital asset-specific blockchain), including a non-fungible token. A non-fungible token may comprise a token that is associated with a good, a service, a smart contract, and/or other content that may be verified by, and stored using, blockchain technology.

In some embodiments, blockchain operations may also comprise actions related to mechanisms that facilitate other blockchain operations (e.g., actions related to metering activities for blockchain operations on a given blockchain network). For example, Ethereum, which is an open-source, globally decentralized computing infrastructure that executes smart contracts, uses a blockchain to synchronize and store the system's state changes. Ethereum uses a network-specific cryptocurrency called ether to meter and constrain execution resource costs. The metering mechanism is referred to as "gas." As the system executes a smart contract, the system accounts for every blockchain operation (e.g., computation, data access, transaction, etc.). Each blockchain operation has a predetermined cost in units of gas (e.g., as determined based on a predefined set of rules for the system). When a blockchain operation triggers the execution of a smart contract, the blockchain operation may include an amount of gas that sets the upper limit of what can be consumed in running the smart contract. The system may terminate execution of the smart contract if the amount of gas consumed by computation exceeds the gas available in the blockchain operation. For example, in Ethereum, gas comprises a mechanism for allowing Turing-complete computation while limiting the resources that any smart contract and/or blockchain operation may consume.

In some embodiments, gas may be obtained as part of a blockchain operation (e.g., a purchase) using a network-specific cryptocurrency (e.g., ether in the case of Ethereum). The system may require gas (or the amount of the network-specific cryptocurrency corresponding to the required amount of gas) to be transmitted with the blockchain operation as an earmark to the blockchain operation. In some embodiments, gas that is earmarked for a blockchain operation may be refunded back to the originator of the blockchain operation if, after the computation is executed, an amount remains unused.

Some blockchains, in addition to general smart contracts, allow users to create individual tokens that can be exchanged on the blockchain. For example, the Ethereum blockchain includes smart contracts that themselves define a new token, separate from Ethereum, that can also be exchanged and tracked on the Ethereum network. These separate tokens' behaviors may be defined by one or more standards on the Ethereum network, the most common of which is referred to as the ERC-20 standard. ERC-20 is the technical standard used for all smart contracts on the Ethereum blockchain for token implementation and provides a list of rules that all Ethereum-based tokens must follow. Today there are over 350,000 different ERC-20 token contracts (i.e., types of tokens) on the Ethereum blockchain alone.

Moreover, smart contracts have been developed to provide some of the same financial services that are available through more traditional banking and market institutions. These transactions include lending, borrowing, investing, and accruing rewards. In the case of rewards, for instance, a user may choose to invest an amount of underlying principal cryptocurrency with a smart contract, thereby allowing the smart contract (or underlying entity) to lend out the invested principal to other users or entities. In return, the smart contract may allocate rewards or interest to the lending user. Oftentimes, the rewards or interest are provided with a different type of cryptocurrency token specific to the blockchain on which the smart contract operates. The use of blockchain-specific reward or interest tokens allows for greater blockchain inter-operability. USDC, for example, is a cryptocurrency that can may be used on multiple different blockchains. To provide rewards or interest for investing USDC on the Ethereum blockchain, one ERC-20 protocol, Compound, rewards cUSDC which is an ERC-20 wrapped token that is tied to a value or amount of USDC. As noted above, the security of transactions through smart contracts are significantly higher than traditional financial transactions given the secure and immutable nature of smart contracts through which the transactions are performed.

With the number of different smart contract protocols, cryptocurrencies, and correspondingly, smart contract interfaces, developing a common platform to interface with each of the multitude of smart contracts and transact with and manage their corresponding cryptocurrencies can be time-consuming and resource intensive. For example, the common platform may be required to recognize and execute different function calls for each of a multitude of smart contracts, despite the underlying process or transaction corresponding to the different function calls being the same.

FIG. 1 illustrates one example of a network architecture 100 that may be used to implement one or more illustrative aspects described herein. Various network nodes 103, 105, 107, and 109 may be interconnected via a wide area network (WAN) 101, such as the Internet. Other networks may also or alternatively be used, including private intranets, corporate networks, LANs, wireless networks, personal networks (PAN), and the like. Network 101 is for illustration purposes and may be replaced with fewer or additional computer networks. A local area network (LAN) may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, second server 105 (e.g., a web server, blockchain node, etc.), and client computers 107, 109. Data server 103 provides overall access, control and administration of databases and control software for performing one or more illustrative aspects described herein. Data server 103 may be connected to second server 105 through which users interact with and obtain data as requested. Alternatively, data server 103 may act or include the functionality of the second server itself and be directly connected to the Internet. Data server 103 may be connected to second server 105 through the network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access second server 105 using an Internet browser, as is known in the art, or by executing a software application that communicates with second server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device, e.g., laptops, desktops, tablets, smartphones, servers, micro-PCs, etc. Data server 103, e.g., may include a processor 111 controlling overall operation of the data server 103. Data server 103 may further include RAM 113, ROM 115, network interface 117, input/output interfaces 119 (e.g., keyboard, mouse, display, printer, etc.), and memory 121. I/O 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or may not be used in conjunction with other aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS), etc.

One or more aspects described herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects, and such data structures are contemplated within the scope of computer executable instructions and computer-usable data described herein.

In some embodiments, network architecture 100 may comprise decentralized autonomous organization. As referred to herein, a decentralized autonomous organization, sometimes referred to as a decentralized autonomous corporation, is an organization represented by rules encoded as a computer program that is transparent, controlled by the organization members, and not influenced by a central government. For example, a blockchain decentralized autonomous organization may be software running on a blockchain that offers users (e.g., user devices within the organization and/or blockchain network) a built-in model for the collective management of its code. The blockchain may reside on one or more decentralized computing devices.

Figure 2:
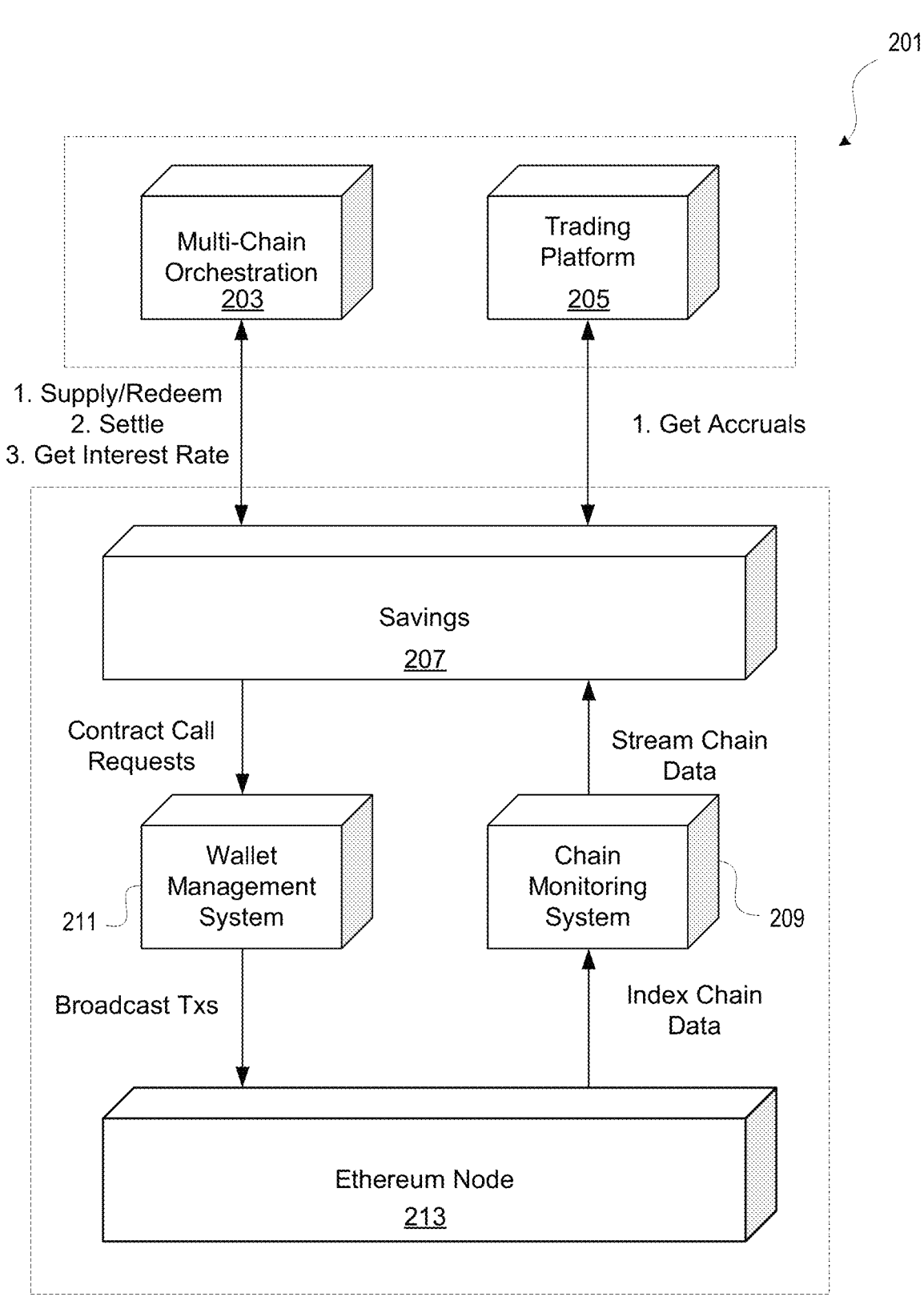
FIG. 2 depicts a computing system that may be used to implement one or more aspects described herein.

Turning now to FIG. 2, as discussed above, a blockchain generally refers to a digital and distributed database, or ledger, of transactions, recorded and replicated in real time across a network of computers or nodes, such as those shown in FIG. 1. Every transaction is cryptographically validated via a consensus mechanism or protocol executed by the nodes before being permanently added as a new "block" at the end of the "chain" of data. There is no need for a central authority to approve the transaction, because the nodes in the network cryptographically confirm accuracy and agree via the consensus protocol before data is added—blockchains are thus referred to as peer-to-peer trustless systems. Thus, providing financial services through blockchains can be advantageous given the accuracy and security inherent to blockchains. In particular, blockchains can provide financial services through an automated and secure code in a smart contract accessible to various customer platforms.

FIG. 2 illustrates an example system through which a custodian or exchange service may facilitate financial transactions and support different blockchain protocols, including different types of cryptocurrency tokens. For example, the illustrated cryptocurrency management system 201 is configured to support, execute, and coordinate financial services, such as lending, borrowing, and issuing rewards, for multiple cryptocurrencies and their associated protocols. In the illustrative arrangement, cryptocurrency management system 201 includes a multi-chain orchestration module 203 as well as a trading platform 205. Multi-chain orchestration module 203 is generally responsible for and configured to interpret and act on user requests for supplying, redeeming, and settling cryptocurrency with the savings service 207, which is described in further detail below. The multi-chain orchestration module 203 may further provide a user interface allowing users to select various cryptocurrency services. In response to a user requesting one of the services, multi-chain orchestration module 203 may process the request, with the help of savings service module 207, including identifying and invoking corresponding functions, and providing requisite parameters to execute the user's request. Identifying the appropriate functions or function calls may include identifying the smart contract(s) corresponding to the cryptocurrency with which the user wishes to transact and/or corresponding to the type of financial service sought.

One feature of the multi-chain orchestration module 203 is its ability to allow and facilitate transactions across multiple types of cryptocurrencies and protocols. For example, Ethereum smart contracts may allow transactions using Bitcoin despite Ethereum and Bitcoin existing on different blockchains that are not directly interoperable. The multi-chain orchestration module 203 and system 201 are configured to facilitate such interactions with disparate blockchains (e.g., Bitcoin and Ethereum) by acting as an intermediary using wrapped tokens. Wrapped tokens generally refer to a representative currency token that is tied to the value of another cryptocurrency. For example, Wrapped Bitcoin (WBTC) is a tokenized version of the Bitcoin currency (1:1 value ratio) for use on the Ethereum blockchain/network. Accordingly, to handle transactions using Bitcoin in the Ethereum network, a user may deposit an amount of Bitcoin into a custodial account (e.g. designated in a smart contract) in the Bitcoin network, and in exchange, receive a corresponding amount of Wrapped Bitcoin in the Ethereum network. In system 201, the multi-chain orchestration module 203 may facilitate such a deposit process, including interfacing with the savings service module 207 to invoke the corresponding smart contract and function for supplying the indicated amount and type of cryptocurrency to a facilitator or custodial account. In exchange, a corresponding amount of a related second type of cryptocurrency (e.g., a wrapped token) is deposited to the user's account (e.g., wallet), as discussed in further detail below.

Wrapped tokens further allow for cryptocurrency-based financial services across different types of cryptocurrencies. By using wrapped tokens, cryptocurrency management system 201 allows users to lend, borrow, and invest funds using any one of the myriad cryptocurrencies that exist irrespective of the underlying network or blockchain. For rewards and investments, wrapped tokens may represent the underlying principal cryptocurrency deposited by the user as well as rewards accrued based on the investment of that principal. In some instances, the same type of wrapped token may be used for both, while in other instances, a first type of wrapped token may be used to represent the underlying principal, while a second type of wrapped token is used for rewards. Wrapped tokens may be subsequently exchanged or redeemed for the underlying cryptocurrency at the user's request and/or upon satisfaction of some other condition (e.g., a particular investment period).

In some arrangements, the cryptocurrency management system 201 may specify a single account (e.g., wallet address) for each wrapper protocol or contract, rather than separate accounts for each user or user wallet. For example, the cryptocurrency management system 201 may designate a first delegate account for all WBTC tokens, a second delegate account for all WETH tokens, and so on, irrespective of which user those tokens belong to. Additionally, in some instances, a single underlying token may be associated with multiple wrapped tokens, in which case the cryptocurrency management system 201 may maintain separate delegate accounts for each type of wrapped token corresponding to the underlying cryptocurrency.

A delegate account (or accounts) may similarly be used for reward accrual. For example, all rewards accrued through a particular smart contract, irrespective of investing user or entity, may be stored in a single delegate account. Different types of rewards (e.g., different reward token type and/or rewards accrued through different smart contracts) may be stored in different delegate accounts. Additionally, the reward delegate account may be different from an account, or accounts, storing the wrapped tokens representing the underlying principal funds invested by the user. Using different delegate accounts for rewards versus the underlying principal may allow for each to be differently accounted (e.g., redeemed, allocated, etc.). Alternatively, rewards may be stored to each individual's account, rather than in aggregate in a single delegate account.

System 201 further includes a trading platform 205 responsible for and configured to calculate or otherwise determine rewards accrued by users (or other investment entity) of the cryptocurrency management system 201 on an individual basis. For example, trading platform 205 may interface with savings service 207 to obtain settled rewards accruals and to calculate and pay out rewards on an entity-by-entity basis. As noted before, rewards may accumulate when a user deposits or supplies cryptocurrency to a smart contract for a certain period of time, for a particular purpose, or in satisfaction of some specified condition(s) or criterion/criteria. Because the cryptocurrency management system 201 is configured to interface with and facilitate transactions using multiple cryptocurrencies, various types of cryptocurrency rewards (e.g., different reward tokens) may be earned depending on the underlying investment cryptocurrency protocol. In one example, one cryptocurrency protocol may have an APY of 3.2% while another cryptocurrency protocol may have an APY of 2.7%. In another example, a predefined amount (e.g., number of tokens) of cryptocurrency may be rewarded by locking in a certain amount of cryptocurrency for a specified amount of time. Trading platform 205 allows for the accumulation of all of these rewards in a single platform and by a single custodial system so that a user may efficiently manage all of their assets through one system.

Savings service module 207 interfaces with both the multi-chain orchestration module 203 as well as the trading platform 205 and is responsible for managing funds in and out of the various cryptocurrency smart contracts in the network. For example, savings service module 207 may be configured to identify the corresponding smart contract(s) for a particular cryptocurrency and to provide the logic for determining which function calls to execute within those contracts depending on the service being requested by the user through the multi-chain orchestration module 203 and/ or trading platform 205. The function calls and interface with the smart contracts may be exposed to the savings service module 207 by a wallet management system 211. The wallet management system 211 is responsible for managing each of the wallets of the cryptocurrency management system 201 and the funds stored therein. Accordingly, when cryptocurrency is to be supplied to a smart contract, the wallet management system 211 orchestrates this transfer through a blockchain node, such as Ethereum node 213, based on the function calls exposed to and invoked by the saving service module 207. In another example, when a user wishes to redeem underlying principal, the wallet management system 211 may coordinate the transfer with the appropriate smart contract through node 213.

Savings service module 207 may further be responsible for receiving and processing blockchain data from a chain monitoring system, such as system 209, to create accrual records when certain actions (e.g., issuance of rewards) occur on the blockchain. For example, when a particular protocol issues rewards (e.g., for the securitization of certain principal), the chain monitoring system 209 may feed that data to the savings service module 207 which, in turn, generates an accrual record indicating that a particular amount of reward has been earned. This data may then be provided to the trading platform 203 to calculate the rewards for each individual user or account as discussed previously.

The modules illustrated in FIG. 2 may be implemented in hardware, software, or a combination of hardware and software. Additionally, the modules of FIG. 2 may be deployed in a single computing device or across multiple computing devices connected locally or through a remote network or a combination of both.

A multi-chain management system such as system 201 of FIG. 2 may use a single standardized interface for interacting with smart contracts to efficiently transact in various cryptocurrency protocols. The interface may be defined by a set of uniform function calls and/or functions configured to perform various cryptocurrency processing tasks. The standard interface may be adopted by smart contracts for each of the cryptocurrency protocols supported by the multi-chain management system. In one arrangement, a standard smart contract interface may be defined for rewards or incentive-based smart contract services. Using a standard interface for rewards allows the multi-chain management system to support rewards for a variety of blockchain protocols through a single platform. Accordingly, in a particular example, a user may earn or otherwise accrue rewards by using both DAI cryptocurrency and Compound cryptocurrency as collateral through the same platform (e.g., multi-chain management system 201), without requiring different and/or unique interfaces to be developed for each of the different cryptocurrency protocols.

The standard reward interface may include a variety of predefined function calls and/or functions that allow the multi-chain management system to transact with the underlying token (e.g., DAI, USDC, Ethereum, Bitcoin) in a uniform manner across multiple smart contracts. In other words, the multi-chain management system does not need to identify and execute different function calls unique to each of the cryptocurrency protocols for performing the same action or process. For example, functions and function calls such as for identifying reward token addresses, checking reward balances, determining an annual percentage yield for a particular reward token, supplying an underlying cryptocurrency token as collateral for accruing awards, redeeming an underlying cryptocurrency token, claiming rewards, retrieving and/or changing delegate and administrator addresses may be standardized across all reward-providing smart contracts.

Illustrative examples of these function calls are described in detail below, but additional or different function calls may also be defined depending on the needs or desires of users and/or the multi-chain management system. The below described function calls (e.g., input parameters, separation and combinations of functionality, and accounting processes defined thereby) provide efficient management and accounting of cryptocurrency transactions for rewards-based services.

FIG. 3 illustrates an example function call for obtaining a list of all reward token addresses associated with a particular smart contract or cryptocurrency protocol. The illustrative function call "rewardTokens" returns a set of addresses in array "address[ ]". These addresses may identify wallets where the supply of reward tokens is stored before they are awarded or otherwise allocated. In some arrangements, a single underlying cryptocurrency may be associated with multiple different types of reward tokens. Accordingly, these different types of reward tokens may be stored at different addresses.

FIG. 4 illustrates an example function call "balanceOf-Reward" for checking the balance of accrued reward tokens for a particular account or address. In this arrangement, the function call inputs include an address corresponding to a reward token account and an address corresponding to an underlying token account. This arrangement uses a single account (e.g., a delegate account) that aggregates and accumulates all reward tokens accrued by all users/accounts, while storing each user's underlying tokens in separate user accounts. Accordingly, to determine the balance of rewards belonging to each user in the aggregate account, the system may use the underlying token balance (upon which the rewards accrued) to appropriately calculate a reward balance for that user. For example, the system may use a known reward accrual rate along with the user's underlying token balance to calculate the amount of rewards accrued by that particular user or account. In other arrangements, separate reward accounts may be created for each user or wallet, in which case only the reward account address for a particular user may be necessary as an input for the balance checking function call.

FIG. 5 illustrates example function call "rate" which returns the reward or investment yield rate for a particular reward token. The function call takes a rewardToken address as input to identify the type of reward token for which a rate is being requested. The rate may be used for a variety of purposes. For example, as noted above, the reward rate may be used to calculate a reward balance for a particular user. Additionally, the reward rate may be requested by a user to determine whether to invest in that cryptocurrency reward protocol. The rate may also be used to project reward accruals.

As discussed throughout, the basis for accumulating cryptocurrency rewards is an investment of an underlying cryptocurrency (e.g., Bitcoin, Ethereum, DAI, USDC, etc.) as collateral. This collateral may be used (e.g., by a third party) for loans or other financial services and activities. Accordingly, users who provide such collateral are typically rewarded for such investments. To supply or invest the underlying cryptocurrency, the system may use a "supply" function call as illustrated in one example in FIG. 6. This example "supply" function call takes two inputs or parameters, one specifying the address for an account to which a corresponding wrapper token is to be deposited, as well as the amount of the underlying token to invest or supply. Each underlying token-wrapper token pair may have its own exchange or conversion rate. In some instances, each wrapper token may represent one underlying token. In other examples, each wrapper token may represent some fraction or multiple of the underlying token. Other conversation algorithms may also be defined.

Once supplied, an underlying token may be redeemed using a claim function call, an example of which is illustrated in FIG. 7. The "claim" function call takes two parameters, a receiver address identifying an account to which the underlying token is to be deposited (e.g., user's wallet) and an amount of the underlying token to be redeemed. In some arrangements, the claim function call only returns or deposits the underlying token and not accrued rewards. Instead, the standard interface may define a separate reward claiming function. In FIG. 8, an example reward "redeem" function call is illustrated for obtaining a user's accrued rewards separate from the claim functionality. The "redeem" function call takes parameters including one or more receiver addresses, one or more reward token addresses and one or more amounts corresponding to the one or more reward token addresses. These parameters may be defined as arrays so as to allow the system to claim multiple types of reward tokens at one time. Accordingly, the parameter arrays of the redeem function call may be required to all be of the same length or size.

FIG. 9 illustrates an example function call for both redeeming a user or entity's underlying principal and claiming corresponding rewards in a single process. The "redeemAndClaim" function call takes three parameters: a receiver address variable, an amounts variable, and a claim tokens address variable. The receiver address variable specifies the list of accounts to which tokens are to be credited. In one arrangement, the receiver address variable is an array, where one element of the array (e.g., the first element, i.e., receivers[0]) specifies the address to which the underlying principal token is to be sent. The other elements of the receiver address array (e.g., the second through nth element, i.e., receivers[1]-[n−1]) may specify the addresses to which each type of reward token is to be sent. The addresses for each of the reward tokens are specified in the claimTokens address array, with the understanding that there is a one-to-one correspondence between each of the second to nth elements of the receiver address array and each of the elements of the claimTokens address array. For example, the second element of the receiver address array, i.e., receivers[1], may identify the receiver account to which to send reward tokens stored at the reward token address indicated in claimTokens[0], the third element of the receiver address array, e.g., receivers[2], may specify the receiving account to which to send reward tokens stored at the reward token address indicated in claimTokens[1], and so on. This correspondence may be predefined as part of the standard interface. The amount of each token to be claimed or redeemed is specified in the amounts parameter, which may similarly be defined as an array. Thus, the elements of the amounts array may also have a one-to-one mapping to the receiver addresses and reward token addresses.

FIGS. 10*a* and 10*b* illustrate function calls for managing a delegate account address for a smart contract. For example, FIG. 10*a* allows a system to obtain the delegate address currently specified in the contract, while FIG. 10*b* allows the system to update that address. The delegate update function call as shown in FIG. 10*b* might also return a current balance in that delegate address as part of the update. For security purposes, only certain systems and/or entities may be allowed to update the delegate address.

FIGS. 11*a* and 11*b* illustrate function calls for managing an admin address. One function, shown in FIG. 11*a*, allows a system to determine the current admin address, while another function call, an example of which is illustrated in FIG. 11*b*, allows for updating of that address. As with the delegate address, only certain systems and/or entities may be allowed to update the admin address for security reasons.

Further, the contract may define multiple events to notify one or more entities of certain actions. For example, event notifications may include supply, redeem, claim, delegate updated, and admin transferred as shown in FIGS. 12*a-e*, respectively. In a particular example, after a user or other entity supplies cryptocurrency to the smart contract, the event "supply" (e.g., FIG. 12*a*) may be called to notify one or more systems or entities of that supply event. Such events may be used for security purposes, e.g., to log important or sensitive transactions. Similarly, when a user or entity redeems principal or claims rewards, the corresponding event (i.e., Redeem (FIG. 12*b*) and Claim (FIG. 12*c*), respectively) may be called to issue an appropriate notice of that transaction. These events or notices may be monitored and flagged in the event one or more conditions are satisfied. For example, if a supply amount exceeds a particular threshold or if a rate of supply, redemption and/or claiming exceeds a specified threshold. A variety of conditions may be defined based on event notifications to alert users or entities of issues occurring through a particular smart contract. Additionally, in some arrangements, the event notification conditions may be adaptive and learn user or entity behavior over time. For example, initially, a supply event notification may be called and/or issued when user A deposits at least 10 tokens of a particular cryptocurrency. However, over time, the system may observe that user A routinely deposits 10 or more tokens. After a certain number of deposits of at least 10 tokens, the system may automatically and autonomously update the supply event notification condition to a deposit of at least 20 tokens by user A.

Figure 13:
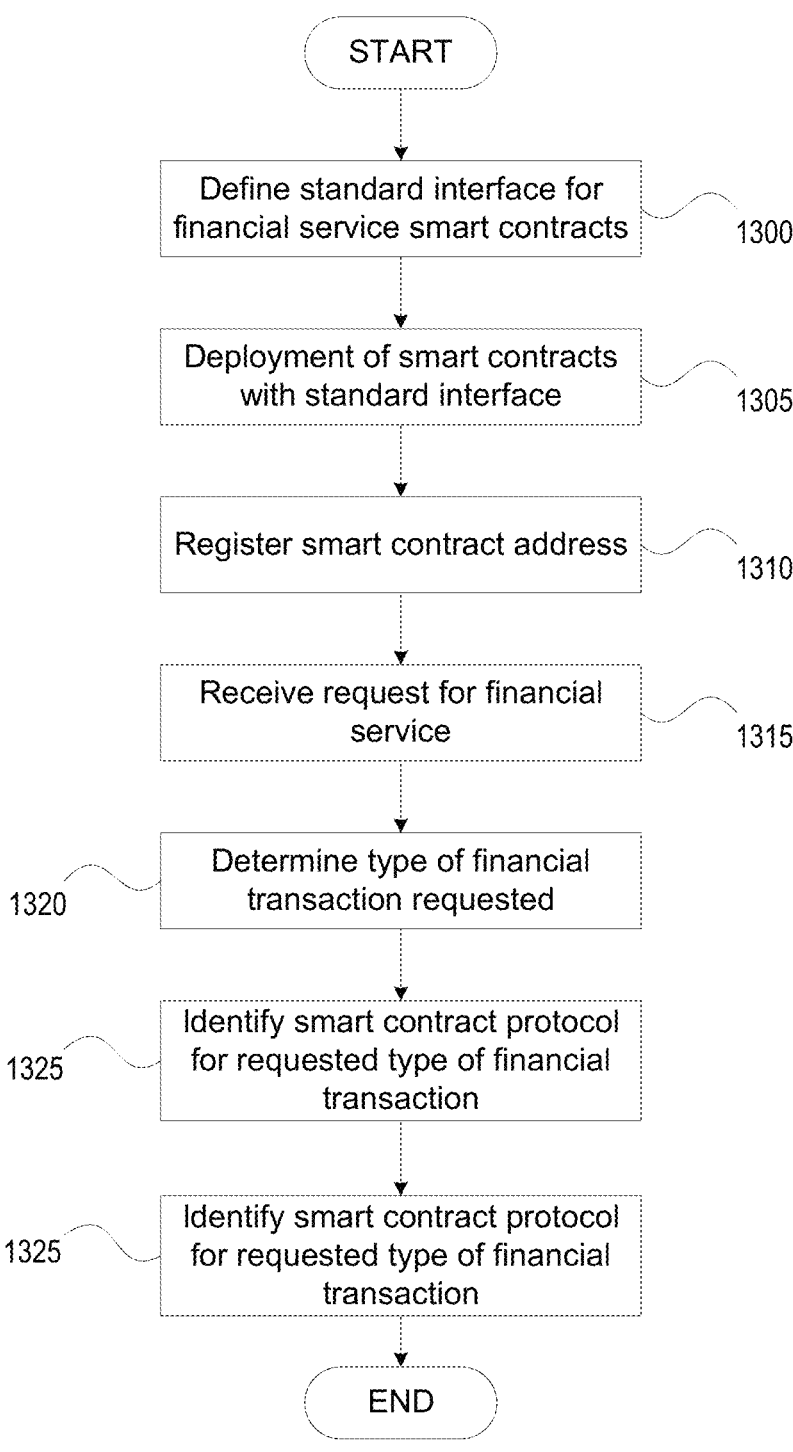
FIG. 13 is a flowchart illustrating an example process by which a multi-chain management system may facilitate financial transactions using multiple types of cryptocurrencies according to one or more illustrative aspects described herein.

FIG. 13 is flowchart illustrating an example process by which a cryptocurrency management system (such as management system 201 in FIG. 2) may interface with and execute financial transactions through multiple smart contracts corresponding to different types of cryptocurrencies. This process includes the deployment of one or more smart contracts corresponding to one or more cryptocurrencies, where each of those smart contract(s) provides a standardized, uniform, interface through which the management system may conduct transactions. Starting at step 1300, for example, the management system may define or otherwise specify a standard interface that smart contracts must provide for compatibility with the system. This standard interface, as has been described, may be defined by a set of one or more standard functions or function calls such as for managing rewards. These function calls may have the same name, receive the same parameters or variables, and return the same data or information across all smart contracts adhering to the standardized interface. The management system may publish the standard interface specification to smart contract providers or may otherwise create the standard interface for each of the smart contracts.

In step 1305, smart contracts with the standard interface are deployed. Deployment generally involves sending the smart contract as a transaction on a particular blockchain network, such as Ethereum, at which point the smart contract is assigned an address. In step 1310, the smart contract address may be registered by the management system in association with identifying information, e.g., to indicate the cryptocurrency protocol and/or financial services to which the smart contract is directed.

The above process may be repeated for each cryptocurrency protocol and smart contract the management system intends to support. Then, in step 1315, the management system may receive a request from a user to perform a reward-based financial transaction using one of the cryptocurrencies for which a standardized smart contract has been defined and deployed. The user request may correspond to any of the functions described herein, such as supplying, redeeming, claiming, checking a balance and the like. For example, the management system may receive a request from a user to invest or deposit a particular type and amount of cryptocurrency to earn interest or other rewards. Alternatively, the user may have already invested some cryptocurrency through one of the smart contracts and is now looking to claim the user's rewards (e.g., interest).

In step 1320, in response to the user's request, the management system may determine the type of financial transaction requested by the user, including the type of cryptocurrency with which the user is seeking to transact. Based on this information, the management system may, in step 1325, identify the appropriate smart contract protocol. In the example where deployed smart contracts are registered with the management system in association with identifying information, the management system may perform a look-up of the smart contract matching the determined type of cryptocurrency. In some systems providing financial services beyond rewards, those different types of financial services (e.g., rewards vs. loans) may be deployed through different smart contracts. Accordingly, the type of financial service may serve as an alternative or further look-up parameter when identifying the appropriate smart contract.

Subsequently in step 1330, the management system may then invoke the appropriate smart contract function calls for executing the requested transaction using the smart contract address identified in step 1325. As has been discussed throughout, because all of the smart contracts have a standardized interface (i.e., a standard set of function calls requiring the same set of one or more parameters for corresponding transactions), the management system does not need to uniquely determine what function to call for each smart contract. Instead, the management system is able to call the same function and provide the same set of uniform input parameters for any of the various deployed smart contracts.

In some arrangements, the management system may also automatically and based on some specified schedule perform certain financial transactions independently of user requests. For example, in the rewards context, the management system may periodically or based on some aperiodic schedule automatically settle or claim accrued rewards for each smart contract protocol into the management system's corresponding delegate account.

Furthermore, because rewards may be accrued into an aggregate delegate account, the management system may perform internal accounting when a particular user wishes to claim that user's portion of the accrued rewards. For example, when a user requests to claim their rewards, the system may first call the redeem function to insure that all rewards have been aggregated into the delegate account, and second calculate how much of the aggregate amount should be allocated to the request user. Various types of accounting may be implemented for this calculation, including tracking a date and time of an initial investment or deposit on which the rewards are based, the amount of the initial investment or deposit, any subsequent investments or deposits and a date and time corresponding thereto, a reward or interest rate during the investment period, any variations to that rate or those rates during the investment period, and the like.

In one particular arrangement, the management system may perform reward accounting by assigning a debt to one or more users. For example, when a first user invests or deposits an amount of underlying principal cryptocurrency, the system may record the amount of principal deposited and assign a reward debt of 0 since the first user is the first to invest in that smart contract and no rewards have yet been accrued. When a second user comes along and decides to also invest in that smart contract, the system may record the amount of principal deposited by that second user, but also assign a reward debt corresponding to the current amount of accrued rewards (e.g., 1 reward token) since those tokens were not accrued by user 2.

Figure 14A:
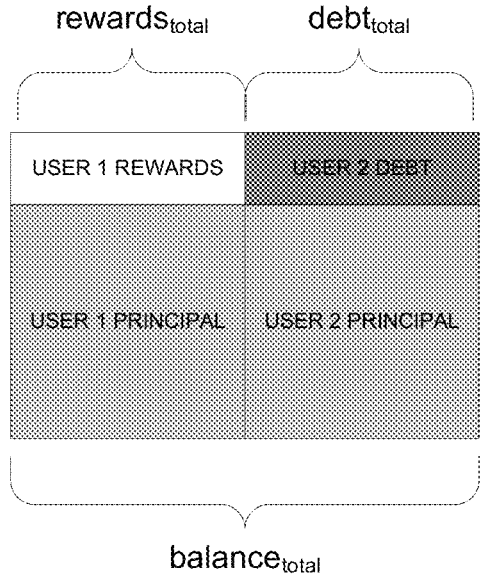
FIGS. 14*a* and 14*b* illustrate a process for performing rewards accounting according to one or more illustrative aspects described herein.
Figure 14B:
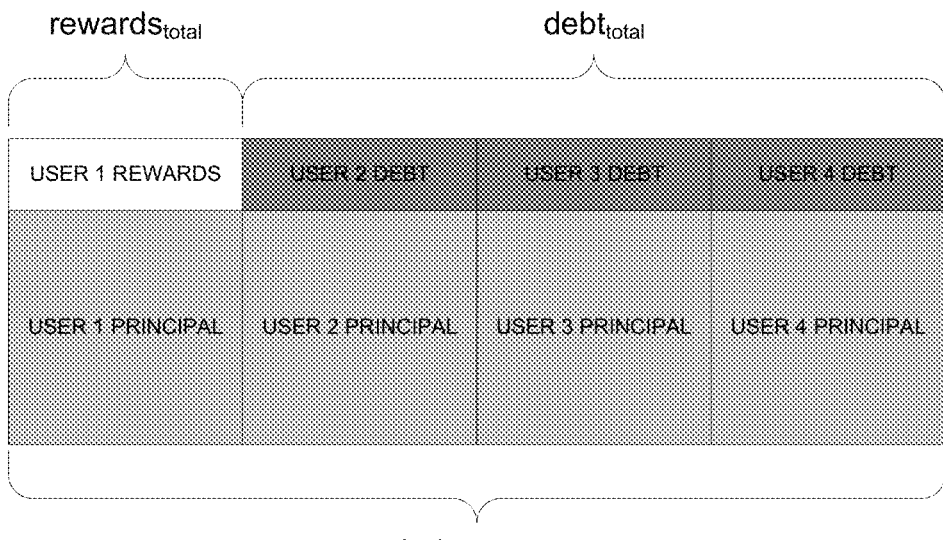

The amount of accrued rewards may be calculated in numerous manners and/or using one or more variables. In some embodiments, the accrued rewards may be calculated as shown in FIGS. 14*a* and 14*b*. This debt allocation is shown in illustrative FIG. 14*a*. To compute the rewards belonging to user 1, the following formula may be applied:

$$rewards_{user} = \frac{balance_{user}}{balance_{total}} \times (rewards_{total} + debt_{total}) - debt_{user}$$

where $balance_{user}$ represents the principal deposited by the first user, (e.g., $balance_{total}$ represents the total amount of principal deposited by all users for that smart contract, $rewards_{total}$ represents the total amount of accrued rewards, $debt_{total}$ represents the total amount of assigned debt across all invested users, and $debt_{user}$ specifies the amount of debt assigned to the first user. For example, the system may execute a function (e.g., the claim function) to retrieve three global variables, wherein the three global variables define a current state of a respective blockchain network (e.g., $balance_{total}$, $rewards_{total}$, $debt_{total}$). The system may then retrieve a user performance metric, wherein the user performance metric is based on three user-specific variables that are optimized to minimize data storage. In some embodiments, the system may use less than the three global variables define the current state of a respective blockchain network. Alternatively or additionally, some embodiments may user different global variables (e.g., variables that represent other criteria beyond debt).

For optimization, the formula may be simplified using a newly defined rewardsPerUnit variable to:

$$rewards_{user} = balance_{user} \times rewardsPerUnit - debt_{user}$$

where:

$$rewardsPerUnit = (rewards_{total} + debt_{total})/balance_{total}$$

Similarly, when a third user and fourth user come along and decide to invest in the same smart contract, the system may record the amount of principal deposited by those entities, and assign a reward debt to each as shown in FIG. 14*b*.

For example, while the use of the multiple deployed smart contracts provides for additional transparency, the multiple deployed smart contracts may also create an additional technical burden in that more blockchain operations are conducted and thus more blockchain characteristics (e.g., variables related to blockchain operation characteristics such as staking positions, rewards occurred, token supply, etc.) require processing. In order to accommodate the additional blockchain characteristics, the methods and system invoke a novel optimization based on three global variables: total balance, total rewards, and total debt as well as the corresponding user variables. The system may likewise minimize the number of variables by reformatting the corresponding user variables into a single variable. By doing so, the amount of data needed to be stored in the blockchain and/or processing by the exchange platform is minimized.

Although the subject matter has been described in language specific to structural features and/or methodological acts, it is to be understood that the subject matter defined in the appended claims is not necessarily limited to the specific features or acts described above. Rather, the specific features and acts described above are disclosed as illustrative forms of implementing the claims.

The above-described embodiments of the present disclosure are presented for purposes of illustration and not of limitation, and the present disclosure is limited only by the claims that follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method, the method comprising: deploying, by a cryptocurrency management system having a memory and at least one processor, a first smart contract configured to interface with a first cryptocurrency protocol defining a first cryptocurrency token, wherein the first smart contract includes at least the following predefined set of functions: a supply function configured to deposit principal cryptocurrency funds; a redeem function configured to withdraw the principal cryptocurrency funds; and/or a claim function configured to obtain reward cryptocurrency accrued based on the deposited principal cryptocurrency; deploying, by the cryptocurrency management system, a second smart contract configured to interface with a second cryptocurrency protocol different from the first cryptocurrency protocol, the second cryptocurrency protocol defining a second cryptocurrency token different from the first cryptocurrency token, wherein the second smart contract includes at least the same functions as the predefined set of functions included in the first smart contract; receiving, by the cryptocurrency management system, a first request to obtain rewards associated with a deposit of an amount of the first cryptocurrency token; invoking, by the cryptocurrency management system, the claim function of the first smart contract to credit a first account with a first amount of cryptocurrency rewards; receiving, by the cryptocurrency management system, a second request to obtain rewards associated with a deposit of an amount of the second cryptocurrency token; and invoking, by the cryptocurrency management system, the claim function of the second smart contract to credit the first account or a second account with a second amount of cryptocurrency rewards.

2. The method of the preceding embodiment, wherein the first amount of cryptocurrency rewards includes an amount of a third cryptocurrency token different from the first and second cryptocurrency tokens.

3. The method of any one of the preceding embodiments, wherein the second amount of cryptocurrency rewards includes an amount of a fourth cryptocurrency token different from the first, second, and third cryptocurrency tokens.

4. The method of any one of the preceding embodiments, wherein the first amount of cryptocurrency rewards includes an additional amount of the first cryptocurrency token.

5. The method of any one of the preceding embodiments, further comprising specifying a delegate address to the first smart contract or the second smart contract, wherein all accrued rewards are deposited to the delegate address.

6. The method of any one of the preceding embodiments, wherein the predefined set of functions further includes a delegate address function for changing the delegate address.

7. The method of any one of the preceding embodiments, wherein the predefined set of functions further includes a combined redeem and redeem function for redeeming the principal cryptocurrency funds and obtaining the accrued reward cryptocurrency.

8. The method of any one of the preceding embodiments, wherein the combined redeem and redeem function is configured to receive, as parameters, a first array identifying a plurality of accounts to which accrued rewards and principal funds are to be deposited and a second array specifying respective amounts to be deposited to each of the plurality of accounts.

9. A method, the method comprising: deploying, by a blockchain exchange platform having a memory and at least one processor, a first smart contract configured to interface with a first blockchain protocol defining a first blockchain token, wherein the first smart contract includes at least the following predefined set of functions: a supply function configured to deposit principal blockchain assets; a redeem function configured to withdraw the principal blockchain assets; and a claim function configured to obtain blockchain operation characteristic updates accrued based on the deposited principal blockchain; and deploying, by the blockchain exchange platform, a second smart contract configured to interface with a second blockchain protocol different from the first blockchain protocol, the second blockchain protocol defining a second blockchain token different from the first blockchain token, wherein the second smart contract includes at least the same functions as the predefined set of functions included in the first smart contract; receiving, by the blockchain exchange platform, a first request to obtain blockchain operation characteristic updates associated with a deposit of an amount of the first blockchain token; invoking, by the blockchain exchange platform, the claim function of the first smart contract to increment a first account with a first amount of blockchain updates; receiving, by the blockchain exchange platform, a second request to obtain blockchain operation characteristic updates associated with a deposit of an amount of the second blockchain token; and invoking, by the blockchain exchange platform, the claim function of the second smart contract to increment the first account or a second account with a second amount of blockchain updates.

10. The method of any one of the preceding embodiments, wherein the first amount of blockchain updates includes an amount of a third blockchain token different from the first and second blockchain tokens.

11. The method of any one of the preceding embodiments, wherein the second amount of blockchain updates includes an amount of a fourth blockchain token different from the first, second, and third blockchain tokens.

12. The method of any one of the preceding embodiments, wherein the first amount of blockchain updates includes an additional amount of the first blockchain token.

13. The method of any one of the preceding embodiments, further comprising specifying a delegate address to the first smart contract or the second smart contract, wherein all accrued updates are deposited to the delegate address.

14. The method of any one of the preceding embodiments, wherein the predefined set of functions further includes a delegate address function for changing the delegate address.

15. The method of any one of the preceding embodiments, wherein the predefined set of functions further includes a combined redeem and redeem function for redeeming the principal blockchain assets and obtaining the accrued reward blockchain.

16. The method of any one of the preceding embodiments, wherein the combined redeem and redeem function is configured to receive, as parameters, a first array identifying a plurality of accounts to which accrued updates and principal assets are to be deposited and a second array specifying respective amounts to be deposited to each of the plurality of accounts.

17. The method of any one of the preceding embodiments, wherein the claim function: retrieves three global variables, wherein the three global variables define a current state of a respective blockchain network; retrieves a user performance metric, wherein the user performance metric is based on three user-specific variables; and determines the first amount of blockchain updates based on the three global variables and the user performance metric.

18. The method of any one of the preceding embodiments, wherein the user performance metric is based on: determining an attestation ratio for the first validator, wherein the attestation ratio comprises a ratio of a number of user devices that attested to a validation proposal of the first validator to a number of user devices that did not attest to the validation proposal of the first validator; and comparing the attestation ratio to a threshold attestation ratio to determine the second performance metric component.

19. A tangible, non-transitory, machine-readable medium storing instructions that, when executed by a data processing apparatus, cause the data processing apparatus to perform operations comprising those of any of embodiments 1-18.

20. A system comprising one or more processors; and memory storing instructions that, when executed by the processors, cause the processors to effectuate operations comprising those of any of embodiments 1-18.

21. A system comprising means for performing any of embodiments 1-18.

What is claimed is:

1. A system for facilitating, via configuration of different protocol-specific smart contracts with a smart contract interface, blockchain operations with the different protocol-specific smart contracts, despite differences between the different protocol-specific smart contracts being configured for different blockchain protocols and while reducing minimizing data storage requirements related to maintaining separate databases of function calls specific to all the different blockchain protocols, the system comprising:

one or more processors and non-transitory computer-readable media comprising instructions that, when executed by the one or more processors, cause operations comprising:

defining the smart contract interface having standardized function names and return values for functions that includes: a supply function that deposits principal blockchain assets; a redeem function that withdraws the principal blockchain assets; and a claim function that obtains blockchain operation characteristic updates accrued based on the deposited principal blockchain assets;

configuring a first smart contract with the smart contract interface such that the first smart contract (i) interfaces with a first blockchain protocol defining a first blockchain token and (ii) includes the standardized function names and return values of the smart contract interface respectively corresponding to a set of first blockchain protocol-specific functions;

configuring a second smart contract with the smart contract interface, such that the second smart contract (i) interfaces with a second blockchain protocol different from the first blockchain protocol and defining a second blockchain token different from the first blockchain token and (ii) includes the standardized function names and return values of the smart contract interface respectively corresponding to a set of second blockchain protocol-specific functions;

deploying (i) the first smart contract to interface with the first blockchain protocol and (ii) the second smart contract to interface with the second blockchain protocol;

subsequent to deploying the first smart contract and the second smart contract, receiving (i) a first request to obtain first blockchain operation characteristic updates associated with a deposit of an amount of the first blockchain token and (ii) a second request to obtain second blockchain operation characteristic updates associated with a deposit of an amount of the second blockchain token; and based on the first request and the second request, causing execution of a first claim function of the first smart contract and a second claim function of the second smart contract, by calling a same standardized function name of the smart contract interface that correspond to both the first claim function and the second claim function, without needing to call function names and parameter sets specific to the first blockchain protocol and specific to the second blockchain protocol to execute the first claim function and the second claim function, wherein the executing of the respective claim functions using the same standardized function name causes (i) the first smart contract to increment a first account with a first amount of blockchain updates via the first smart contract's first claim function and (ii) the second smart contract to increment the first account or a second account with a second amount of blockchain updates via the second smart contract's second claim function.

2. A method facilitating, via configuration of different protocol-specific smart contracts with a smart contract interface, blockchain operations with the different protocol-specific smart contracts, despite differences between the different protocol-specific smart contracts being configured for different blockchain protocols and while reducing data storage requirements related to maintaining separate databases of function calls specific to all the different blockchain protocols, the method comprising:

defining the smart contract interface having standardized function names and return values for functions that includes; a supply function that deposits principal blockchain assets; a redeem function that withdraws the principal blockchain assets; and a claim function that obtains blockchain operation characteristic updates accrued based on the deposited principal blockchain assets;

configuring a first smart contract with the smart contract interface such that the first smart contract (i) interfaces with a first blockchain protocol defining a first blockchain token and (ii) includes the standardized function names and return values of the smart contract interface respectively corresponding to a set of first blockchain protocol-specific functions;

configuring a second smart contract with the smart contract interface such that the second smart contract (i) interfaces with a second blockchain protocol different from the first blockchain protocol and defining a second blockchain token different from the first blockchain token and (ii) includes the standardized function names and return values of the smart contract interface respectively corresponding to a set of second blockchain protocol-specific functions;

deploying (i) the first contract to interface with the first blockchain protocol and (ii) the second smart contract to interface with the second blockchain protocol;

subsequent to deploying the first smart contract and the second smart contract, receiving (i) a first request to obtain first blockchain operation characteristic updates associated with a deposit of an amount of the first blockchain token and (ii) a second request to obtain second blockchain operation characteristic updates associated with a deposit of an amount of the second blockchain token; and based on the first request and the second request, causing execution of a first claim function of the first smart contract and a second claim function of the second smart contract, by calling a same standardized function name of the smart contract interface that correspond to both the first claim function and the second claim function, without needing to call function names and parameter sets specific to the first blockchain protocol and specific to the second blockchain protocol to execute the first claim function and the second claim function, wherein the executing of the respective claim functions using the same standardized function name causes (i) the first smart contract to increment a first account with a first amount of blockchain updates via the first smart contract's first claim function and (ii) the second smart contract to increment the first account or a second account with a second amount of blockchain updates via the second smart contract's second claim function.

3. The method of claim 2, wherein the first amount of blockchain updates includes an amount of a third blockchain token different from the first and second blockchain tokens.

4. The method of claim 3, wherein the second amount of blockchain updates includes an amount of a fourth blockchain token different from the first, second, and third blockchain tokens.

5. The method of claim 2, wherein the first amount of blockchain updates includes an additional amount of the first blockchain token.

6. The method of claim 2, further comprising specifying a delegate address to the first smart contract or the second smart contract, wherein all accrued updates are deposited to the delegate address.

7. The method of claim 6, wherein the standardized function names and return values of the smart contract interface further includes a delegate address function for changing the delegate address.

8. The method of claim 2, wherein the standardized function names and return values of the smart contract interface further includes a combined redeem and claim function for redeeming the principal blockchain assets and obtaining accrued blockchain rewards.

9. The method of claim 8, wherein the combined redeem and claim function is configured to receive, as parameters, a first array identifying a plurality of accounts to which accrued updates and principal assets are to be deposited and a second array specifying respective amounts to be deposited to each of the plurality of accounts.

10. The method of claim 2, wherein the claim function of the smart contract interface:

retrieves three global variables, wherein the three global variables define a current state of a respective blockchain network;

retrieves a user performance metric, wherein the user performance metric is based on three user-specific variables; and determines the first amount of blockchain updates based on the three global variables and the user performance metric.

11. The method of claim 10, wherein the user performance metric is based on:

determining an attestation ratio for a first validator, wherein the attestation ratio comprises a ratio of a number of user devices that attested to a validation proposal of the first validator to a number of user devices that did not attest to the validation proposal of the first validator; and comparing the attestation ratio to a threshold attestation ratio to determine a second performance metric component.

12. A One or more non-transitory, computer-readable media comprising instructions, that when executed by one or more processors, cause operations comprising:

defining smart contract interface having standardized function names and return values for functions that includes: a supply function that deposits principal blockchain assets; a redeem function that withdraws the principal blockchain assets; and a claim function that obtains blockchain operation characteristic updates accrued based on the deposited principal blockchain assets;

configuring a first smart contract with the smart contract interface, such that the first smart contract (i) interfaces with a first blockchain protocol defining a first blockchain token and (ii) includes the standardized function names and return values of the smart contract interface respectively corresponding to a set of first blockchain protocol-specific functions;

configuring a second smart contract with the smart contract interface such that the second smart contract (i) interfaces with a second blockchain protocol different from the first blockchain protocol and defining a second blockchain token different from the first blockchain token and (ii) includes the standardized function names and return values of the smart contract interface respectively corresponding to a set of second blockchain protocol-specific functions;

deploying (i) the first smart contract to interface with the first blockchain protocol and (ii) the second smart contract to interface with the second blockchain protocol;

subsequent to deploying the first smart contract and the second smart contract, receiving (i) a first request to obtain first blockchain operation characteristic updates associated with a deposit of an amount of the first blockchain token and (ii) a second request to obtain second blockchain operation characteristic updates associated with a deposit of an amount of the second blockchain token; and based on the first request and the second request, causing execution of a first claim function of the first smart contract and a second claim function of the second smart contract, by calling a same standardized function name of the smart contract interface that correspond to both the first claim function and the second claim function, without needing to call function names and parameter sets specific to the first blockchain protocol and specific to the second blockchain protocol to execute the first claim function and the second claim function, wherein the executing of the respective claim functions using the same standardized function name causes (i) the first smart contract to increment a first account with a first amount of blockchain updates via the first smart contract's first claim function and (ii) the second smart contract to increment the first account or a second account with a second amount of blockchain updates via the second smart contract's second claim function.

13. The non-transitory, computer-readable media of claim 12, wherein the first amount of blockchain updates includes an amount of a third blockchain token different from the first and second blockchain tokens.

14. The non-transitory, computer-readable media of claim 13, wherein the second amount of blockchain updates includes an amount of a fourth blockchain token different from the first, second, and third blockchain tokens.

15. The non-transitory, computer-readable media of claim 12, wherein the first amount of blockchain updates includes an additional amount of the first blockchain token.

16. The non-transitory, computer-readable media of claim 12, wherein the standardized function names and return values of the smart contract interface further includes a combined redeem and claim function for redeeming the principal blockchain assets and obtaining accrued blockchain rewards.

17. The non-transitory, computer-readable media of claim 16, wherein the combined redeem and claim function is configured to receive, as parameters, a first array identifying a plurality of accounts to which accrued updates and principal assets are to be deposited and a second array specifying respective amounts to be deposited to each of the plurality of accounts identified in the first array.

18. The non-transitory, computer-readable media of claim 12, wherein the claim function of the smart contract interface:

retrieves three global variables, wherein the three global variables define a current state of a respective blockchain network;

retrieves a user performance metric, wherein the user performance metric is based on three user-specific variables; and determines the first amount of blockchain updates based on the three global variables and the user performance metric.

19. The non-transitory, computer-readable media of claim 18, wherein the user performance metric is based on:

determining an attestation ratio for a first validator, wherein the attestation ratio comprises a ratio of a number of user devices that attested to a validation proposal of the first validator to a number of user devices that did not attest to the validation proposal of the first validator; and comparing the attestation ratio to a threshold attestation ratio to determine a second performance metric component.

20. The non-transitory, computer-readable media of claim 12, wherein the instructions that, when executed by the one or more processors, further cause operations comprising:

specifying a delegate address to the first smart contract or the second smart contract, wherein all accrued updates are deposited to the delegate address.

* * * * *